(12) United States Patent
Bronicki

(10) Patent No.: US 8,387,355 B2
(45) Date of Patent: Mar. 5, 2013

(54) GAS TURBINE EXHAUST GAS COOLING SYSTEM

(75) Inventor: Lucien Y. Bronicki, Yavne (IL)

(73) Assignee: Ormat Technologies Inc., Reno, NV (US)

( * ) Notice: Subject to any disclaimer, the term of this patent is extended or adjusted under 35 U.S.C. 154(b) by 769 days.

(21) Appl. No.: 12/503,525

(22) Filed: Jul. 15, 2009

(65) Prior Publication Data

US 2011/0011052 A1    Jan. 20, 2011

(51) Int. Cl.
   *F02C 6/00*    (2006.01)
   *F02G 1/00*    (2006.01)
   *F02G 3/00*    (2006.01)

(52) U.S. Cl. ............ 60/39.182; 60/39.5; 60/39.08

(58) Field of Classification Search ........... 60/39.182, 60/39.5, 39.52, 39.511, 39.08, 299; 122/7 R, 122/7 B See application file for complete search history.

(56) References Cited

U.S. PATENT DOCUMENTS

| | | | |
|---|---|---|---|
| 3,808,805 A * | 5/1974 | Miramontes | 60/274 |
| 4,106,286 A * | 8/1978 | Sakai et al. | 60/39.182 |
| 4,466,241 A * | 8/1984 | Inui et al. | 60/39.182 |
| 4,875,436 A * | 10/1989 | Smith et al. | 122/7 R |
| 5,308,810 A * | 5/1994 | Voss et al. | 502/28 |
| 5,555,718 A * | 9/1996 | Anderson et al. | 60/783 |
| 5,617,716 A * | 4/1997 | Schreiber et al. | 60/775 |
| 5,632,143 A * | 5/1997 | Fisher et al. | 60/39.182 |
| 5,664,414 A * | 9/1997 | Bronicki et al. | 60/39.182 |
| 6,351,935 B1 * | 3/2002 | Bronicki et al. | 60/39.182 |
| 6,474,069 B1 * | 11/2002 | Smith | 60/727 |
| 6,497,090 B2 * | 12/2002 | Bronicki et al. | 60/39.6 |
| 6,539,723 B2 * | 4/2003 | Bronicki et al. | 60/774 |
| 6,571,548 B1 | 6/2003 | Bronicki et al. | |
| 6,910,335 B2 * | 6/2005 | Viteri et al. | 60/786 |
| 6,945,052 B2 * | 9/2005 | Frutschi et al. | 60/772 |
| 7,942,008 B2 * | 5/2011 | Joshi et al. | 60/772 |
| 8,141,367 B2 * | 3/2012 | Rancruel et al. | 60/772 |
| 2003/0154718 A1 | 8/2003 | Nayar | |
| 2007/0039305 A1 | 2/2007 | Taha et al. | |
| 2008/0289313 A1 | 11/2008 | Batscha et al. | |

OTHER PUBLICATIONS

International Search Report mailed on Dec. 28, 2010, in PCT IB 10/01701.

* cited by examiner

*Primary Examiner* — William H Rodriguez
(74) *Attorney, Agent, or Firm* — Oblon, Spivak, McClelland, Maier & Neustadt, L.L.P.

(57) ABSTRACT

A gas turbine exhaust gas cooling system includes a conduit for a primary gas turbine exhaust gas extending from the primary gas turbine to an inlet of a desired industrial process apparatus, a work producing thermodynamic cycle in which a working fluid is heated and expanded, and at least one heat exchanger by which heat is sufficiently transferred from the primary gas turbine exhaust gas to the working fluid to produce a low temperature heating medium downstream of the heat exchanger at a predetermined temperature and energy level which are sufficient for effecting a desired industrial process.

9 Claims, 2 Drawing Sheets

GAS TURBINE EXHAUST GAS COOLING SYSTEM

FIELD OF THE INVENTION

The present invention relates to the field of waste heat recovery systems. More particularly, the invention relates to a system for cooling the exhaust of a gas turbine and for delivering the cooled exhaust to a process.

BACKGROUND OF THE INVENTION

Several industrial processes, such as a Selective Catalytic Reduction (SCR) system, a reboiler, and a demethanizer boiler of a gas plant, require a low temperature heating medium.

A pre-cooled gas turbine exhaust often is the source of the low temperature heating medium.

One known method of cooling the gas turbine exhaust is by spraying water into the exhaust gas. The supply of water into the gas turbine exhaust generally detrimentally affects the process due to the presence of water or steam within the low temperature heating medium as the dew point of the heating medium is lowered. Another drawback of this method is that water may be in short supply.

Another method of cooling the gas turbine exhaust is by introducing relatively cold dilution air to the exhaust gas. One of the disadvantages of this method is related to the added power consumption of the fans which introduce the relatively cold air into the exhaust gas. Another disadvantage is related to the increased fluid volume and the increased oxygen content of the heating medium which may detrimentally affect the process.

SUMMARY OF THE INVENTION

There is therefore a need for a gas turbine exhaust gas cooling system that does not use water or fan generated air to cool the gas turbine exhaust gas.

It is an object of the present invention to provide a gas turbine exhaust gas cooling system that produces a low temperature heating medium of a sufficient energy level for effecting a desired process.

It is an additional object of the present invention to provide a gas turbine exhaust gas cooling system that does not use water or fan generated air to cool the gas turbine exhaust gas.

It is an additional object of the present invention to provide a gas turbine exhaust gas cooling system that generates electricity.

Other objects and advantages of the invention will become apparent as the description proceeds.

The present invention is directed to a gas turbine exhaust gas cooling system, comprising a conduit for a primary gas turbine exhaust gas extending from said primary gas turbine to an inlet of a desired industrial process apparatus; a work producing thermodynamic cycle wherein a working fluid thereof is heated and expanded; and at least one heat exchanging means by which heat is sufficiently transferred from said primary gas turbine exhaust gas to said working fluid to produce a low temperature heating medium downstream of said at least one heat exchanging means at a predetermined temperature and energy level which are sufficient for effecting a desired industrial process.

The thermodynamic cycle preferably comprises a secondary turbine through which the working fluid is expanded and a generator coupled to the secondary turbine.

The thermodynamic cycle is selected from the group of a Rankine closed cycle, a Brayton open cycle, and a Brayton closed cycle, and the working fluid is selected from the group of organic fluid, air, and carbon dioxide.

In one aspect, heat is transferred from the primary gas turbine exhaust gas to the working fluid means of a waste heat oil heater (WHOH) loop having first and second heat exchangers, said first heat exchanger adapted to transfer heat from the primary gas turbine exhaust gas to oil circulating within said WHOH loop and said second heat exchanger adapted to transfer heat from said oil to the working fluid.

The desired industrial process is selected from the group of Selective Catalytic Reduction (SCR) system reboiler, and a demethanizer boiler of a natural gas processing plant.

DETAILED DESCRIPTION OF THE PREFERRED EMBODIMENTS

The present invention provides a gas turbine exhaust gas cooling system that produces a low temperature heating medium at a predetermined temperature and energy level which are sufficient for effecting a desired industrial process. A suitable thermodynamic cycle cools the gas turbine exhaust to produce the low temperature heating medium while harnessing the energy content of the gas turbine exhaust to produce electricity. By extracting the heat of the gas turbine exhaust in this fashion, a water or air supply is unnecessary.

Figure 1:
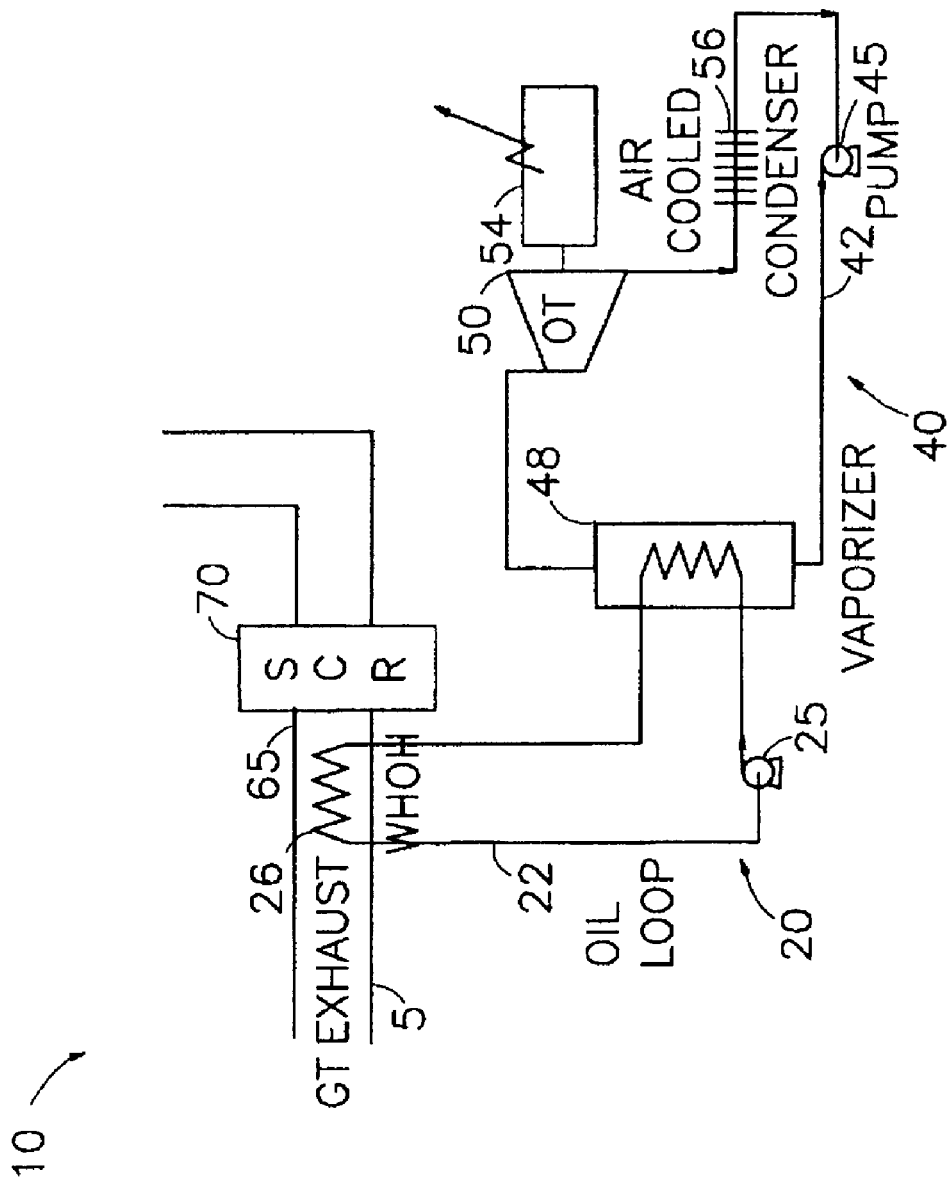
FIG. 1 is a process flow diagram of one embodiment of the present invention wherein the thermodynamic cycle is a Rankine cycle.

FIG. 1 is a process flow diagram of one embodiment of the present invention wherein the thermodynamic cycle is a Rankine cycle. The illustrated gas turbine exhaust gas cooling system generally designated by numeral 10 comprises gas turbine exhaust 5, waste heat oil heater (WHOH) loop 20 which is adapted to extract heat from gas turbine exhaust 5 and to thereby produce the low temperature heating medium, organic Rankine cycle 40 to which heat is transferred from WHOH loop 20, and Selective Catalytic Reduction (SCR) system 70 to which the low temperature heating medium is directed. Cooling system 10 is capable of cooling gas turbine exhaust 5 from about 1200° F. to a lower temperature of about 800° F. at the inlet of the SCR 70.

Rankine cycle 40 is a closed cycle, and organic fluid circulating through conduits 42 can be the working fluid therefor. Pump 45 delivers liquid organic fluid to vaporizer 48. Oil circulating through conduits 22 of WHOH loop 20 is introduced to vaporizer 48 by means of pump 25 and serves to transfer heat to the working fluid of Rankine cycle 40 also passing through the vaporizer. The temperature of the working fluid consequently rises to its boiling point, so that the vaporized working fluid can be supplied to turbine 50. Vaporized working fluid supplied to turbine 50 expands therein and electricity is produced by generator 54 coupled to turbine 50. The working fluid exiting turbine 50 is condensed by means of condenser 56 usually air-cooled to a liquid phase condensate, so that pump 45 delivers the liquid working fluid condensate to vaporizer 48. The cooled oil exiting vaporizer 48 is delivered to heat exchanger 26, which serves to extract heat from gas turbine exhaust 5 and to produce the low temperature heating medium 65 which is delivered to SCR system 70.

In another embodiment of the invention, the closed Rankine cycle is a steam cycle. The pump of the Rankine cycle delivers water to a boiler. Oil circulating through conduits 22 of WHOH loop 20 is introduced to the boiler and sufficiently transfers heat to the delivered water so that the latter will boil and the steam produced drive the turbine, causing the generator coupled to the turbine to produce electricity.

Figure 2:
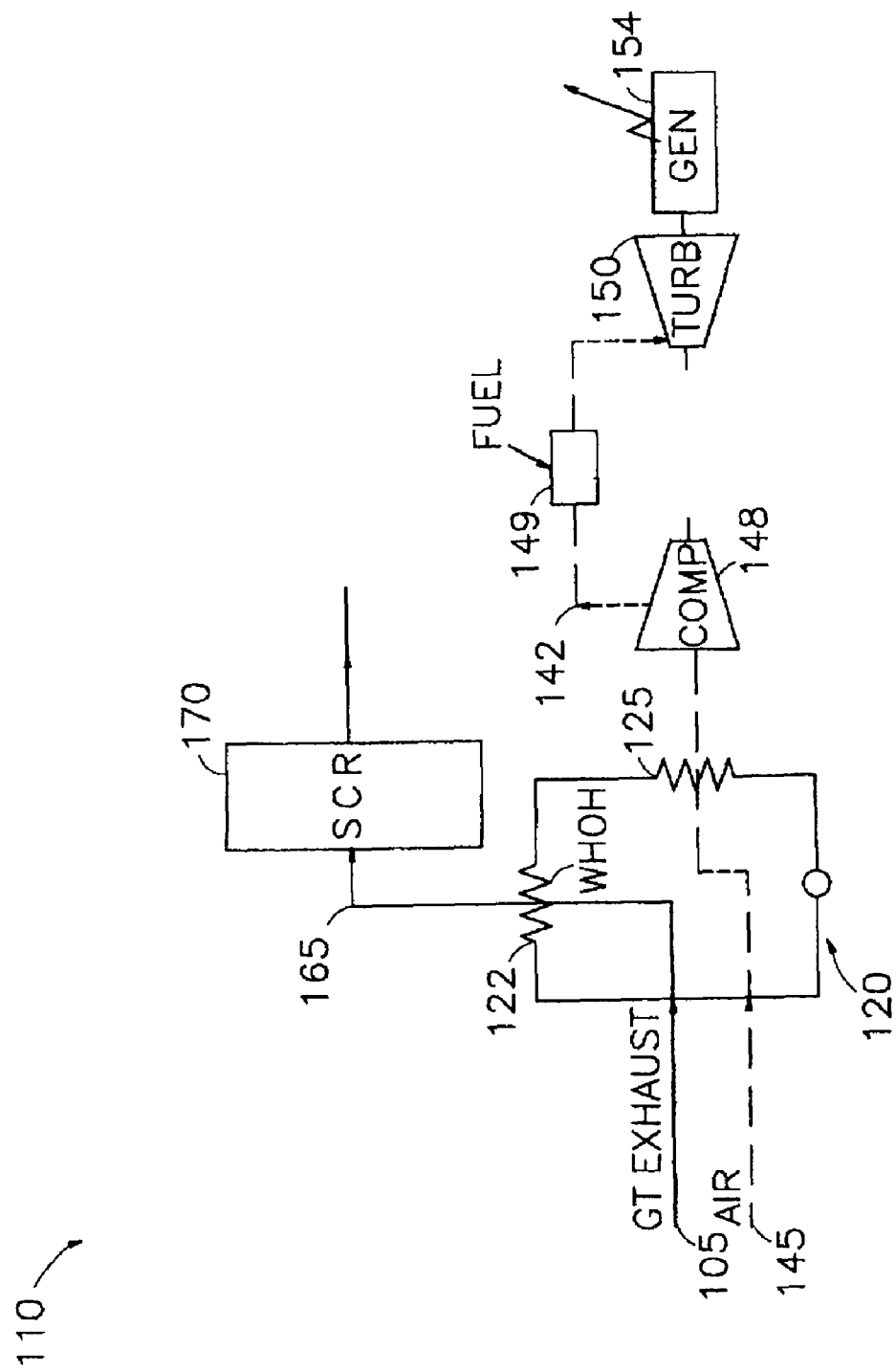
FIG. 2 is a process flow diagram of another embodiment of the present invention wherein the thermodynamic cycle is a Brayton cycle.

FIG. 2 is a process flow diagram of another embodiment of the present invention wherein the thermodynamic cycle can be a Brayton open air cycle. The illustrated gas turbine exhaust gas cooling system generally designated by numeral 110 comprises gas turbine exhaust 105, waste heat oil heater (WHOH) loop 120 which is adapted to extract heat from gas turbine exhaust 105 by means of heat exchanger 122 and to thereby produce the low temperature heating medium, open air Brayton cycle 140 to which heat is transferred from WHOH loop 120, and Selective Catalytic Reduction (SCR) system 170 to which the low temperature heating medium is directed.

Brayton cycle 140 is an open cycle, and air 145 introduced to compressor 148 and flowing through conduits 142 is the working fluid therefor. Air 145 is heated by means of oil-to-air heat exchanger 125 of WHOH loop 120 prior to being introduced to compressor 148. The heated air is compressed by compressor 148 and delivered to combustion chamber 149 whereat fuel is supplied with the compressed air and combusted. The combustion products are delivered to secondary turbine 150, and as the combustion products are expanded in secondary turbine 150, electricity s produced by generator 154 coupled to secondary turbine 150. The cooled oil exiting oil-to-air heat exchanger 125 is delivered to heat exchanger 122 by pump 125, which serves to extract heat from gas turbine exhaust 105 and to produce the low temperature heating medium 165 which is delivered to SCR system 170.

It will be appreciated that the Brayton cycle need not include a combustion chamber, but rather secondary turbine 150 may be an air turbine to which compressed heated air, heated by suitable heating means, is introduced in order to generate electricity. Similarly, the Brayton cycle may be a closed carbon dioxide based cycle wherein heated carbon dioxide is compressed and delivered to the secondary turbine.

Although the above describes the production of a low temperature heating medium as being delivered to the process of SCR, it will be appreciated that the low temperature heating medium is also suitable for effecting other industrial processes as well, such as a reboiler wherein the gas turbine exhaust exits the gas turbine at the temperature of about 900° F. and is delivered to the boiler at a temperature of about 300° F., and a demethanizer boiler of a natural gas processing plant.

While the above description refers to, in the embodiment described with reference to FIG. 1, an organic working fluid operating in an organic Rankine cycle, an organic working fluid or steam-ammonia bottoming cycle can also be used.

While some embodiments of the invention have been described by way of illustration, it will be apparent that the invention can be carried into practice with may modifications, variations and adaptations, and with the use of numerous equivalents or alternative solutions that are within the scope of persons skilled in the art, without departing from the spirit of the invention or exceeding the scope of the claims.

What is claimed is:

1. A gas turbine exhaust gas cooling system, comprising:
   a) a conduit for a primary gas turbine exhaust gas extending from a primary gas turbine to an inlet of a desired industrial process apparatus;
   b) a work producing thermodynamic cycle wherein a working fluid thereof is heated and expanded, wherein the working fluid is selected from the group of organic fluid, air, and carbon dioxide; and
   c) at least one heat exchanger by which heat is sufficiently transferred from said primary gas turbine exhaust gas to said working fluid to produce a low temperature heating medium downstream of said at least one heat exchanger at a predetermined temperature and energy level which are sufficient for effecting a desired industrial process selected from the group of Selective Catalytic Reduction (SCR), reboiler, and a demethanizer boiler of a natural gas processing plant.

2. The cooling system according to claim 1, wherein the thermodynamic cycle comprises a secondary turbine through which the working fluid is expanded and a generator coupled to said second secondary turbine.

3. The cooling system according to claim 2, wherein the thermodynamic cycle is selected from the group of a Rankine closed cycle, a Brayton open cycle, and a Brayton closed cycle.

4. The cooling system according to claim 1, wherein the work producing thermodynamic cycle includes a turbine.

5. A gas turbine exhaust gas cooling system, comprising:
   a) a conduit for a primary gas turbine exhaust gas extending from a primary gas turbine to an inlet of a desired industrial process apparatus;
   b) a work producing thermodynamic cycle wherein a working fluid thereof is heated and expanded; and
   c) at least one heat exchanger by which heat is sufficiently transferred from said primary gas turbine exhaust gas to said working fluid to produce a low temperature heating medium downstream of said at least one heat exchanger at a predetermined temperature and energy level which are sufficient for effecting a desired industrial process,
   wherein said at least one heat exchanger comprises a waste heat oil heater (WHOH) loop having first and second heat exchangers, said first heat exchanger adapted to transfer heat from the primary gas turbine exhaust gas to oil circulating within said WHOH loop and said second heat exchanger adapted to transfer heat from said oil to the working fluid.

6. The cooling system according to claim 5, wherein the thermodynamic cycle comprises a secondary turbine through which the working fluid is expanded and a generator coupled to said second secondary turbine.

7. The cooling system according to claim 6, wherein the thermodynamic cycle is selected from the group of a Rankine closed cycle, a Brayton open cycle, and a Brayton closed cycle.

8. The cooling system according to claim 5, wherein the working fluid is selected from the group of organic fluid, air, and carbon dioxide.

9. The cooling system according to claim 5, wherein the desired industrial process is selected from the group of Selective Catalytic Reduction (SCR), reboiler, and a demethanizer boiler of a natural gas processing plant.

* * * * *